United States Patent
Huang et al.

(10) Patent No.: US 12,192,145 B2
(45) Date of Patent: Jan. 7, 2025

(54) NESTED COMMON SEQUENCE POOL FOR SEQUENCE BASED NON-COHERENT TRANSMISSIONS

(71) Applicant: QUALCOMM Incorporated, San Diego, CA (US)

(72) Inventors: Yi Huang, San Diego, CA (US); Gokul Sridharan, Sunnyvale, CA (US); Wei Yang, San Diego, CA (US); Peter Gaal, San Diego, CA (US); Juan Montojo, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/453,308

(22) Filed: Nov. 2, 2021

(65) Prior Publication Data
US 2022/0140980 A1 May 5, 2022

Related U.S. Application Data

(60) Provisional application No. 63/109,325, filed on Nov. 3, 2020.

(51) Int. Cl.
*H04L 5/00* (2006.01)
(52) U.S. Cl.
CPC .................. *H04L 5/0055* (2013.01)
(58) Field of Classification Search
CPC . H04L 5/0055; H04L 27/261; H04L 27/2614; H04L 1/1854; H04L 1/1607
(Continued)

(56) References Cited

U.S. PATENT DOCUMENTS

| 2016/0028572 A1* | 1/2016 | Suzuki | H04W 16/14 370/281 |
| 2018/0027547 A1* | 1/2018 | Lyu | H04W 72/51 370/329 |

(Continued)

FOREIGN PATENT DOCUMENTS

WO  WO-2021061726  4/2021

OTHER PUBLICATIONS

International Search Report and Written Opinion—PCT/US2021/072207—ISA/EPO—Mar. 4, 2022.

(Continued)

*Primary Examiner* — Mang Hang Yeung
(74) *Attorney, Agent, or Firm* — Norton Rose Fulbright US LLP/Qualcomm Incorporated

(57) ABSTRACT

This disclosure provides systems, methods, and devices for wireless communication that support use of common sequence pools for non-coherent transmissions according to one or more aspects. In a first aspect, a method of wireless communication includes converting, by a wireless communication device, an information bit stream to an integer value. The method also includes selecting, by the wireless communication device, a sequence from a common sequence pool based on the integer value. The common sequence pool has a nested structure of sequences which map different length information bit streams with the same most significant bit or bits to the same sequences. The method further includes transmitting, by the wireless communication device, a non-coherent transmission indicating the sequence. Other aspects and features are also claimed and described.

30 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0278380 A1* | 9/2018 | Kim ...................... | H04L 1/1812 |
| 2020/0068617 A1 | 2/2020 | Yoon et al. | |
| 2020/0351135 A1* | 11/2020 | Moroga .............. | H04L 25/0228 |
| 2022/0225400 A1* | 7/2022 | Wong .................... | H04L 1/1854 |

OTHER PUBLICATIONS

Qualcomm Incorporated: "Potential Coverage Enhancement Techniques for PUCCH", 3GPP Draft, 3GPP TSG-RAN WG1 Meeting #102, R1-2006821, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020 Aug. 8, 2020 (Aug. 8, 2020), XP051918271, 6 Pages, Retrieved from the Internet: URL: https://ftp.3gpp.org/tsg_ran/WG1_RL1/TSGR1_102-e/Docs/R1-2006821.zip R1-2006821 Potential Coverage Enhancement Techniques for PUCCH.docx [retrieved on Aug. 8, 2020] Abstract, Figure 2, p. 1.

* cited by examiner

NESTED COMMON SEQUENCE POOL FOR SEQUENCE BASED NON-COHERENT TRANSMISSIONS

CROSS-REFERENCE TO RELATED APPLICATIONS

This application claims the benefit of U.S. Provisional Patent Application No. 63/109,325, entitled, "NESTED COMMON SEQUENCE POOL FOR SEQUENCE BASED NON-COHERENT TRANSMISSIONS," filed on Nov. 3, 2020, which is expressly incorporated by reference herein in its entirety.

TECHNICAL FIELD

Aspects of the present disclosure relate generally to wireless communication systems, and more particularly, to sequence based non-coherent transmissions. Certain embodiments of the technology discussed below may enable a transmitting device to use a common sequence pool for bit streams of varying lengths.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes converting, by a wireless communication device, an information bit stream to an integer value. The method also includes selecting, by the wireless communication device, a sequence from a common sequence pool based on the integer value. The common sequence pool has a nested structure of sequences which map different length information bit streams with the same most significant bit or bits to the same sequences. The method further includes transmitting, by the wireless communication device, a non-coherent transmission indicating the sequence.

In an additional aspect of the disclosure, an apparatus configured for wireless communication is disclosed. The apparatus includes at least one processor, and a memory coupled to the at least one processor. The at least one processor is configured to convert an information bit stream to an integer value; select a sequence from a common sequence pool based on the integer value, where the common sequence pool has a nested structure of sequences which map different length information bit streams with the same most significant bit or bits to the same sequences; and transmit a non-coherent transmission indicating the sequence.

In an additional aspect of the disclosure, an apparatus configured for wireless communication is disclosed. The apparatus includes means for converting an information bit stream to an integer value; means for selecting a sequence from a common sequence pool based on the integer value, where the common sequence pool has a nested structure of sequences which map different length information bit streams with the same most significant bit or bits to the same sequences; and means for transmitting a non-coherent transmission indicating the sequence.

In an additional aspect of the disclosure, a non-transitory computer-readable medium stores instructions that, when executed by a processor, cause the processor to perform operations including converting, by a wireless communication device, an information bit stream to an integer value; selecting, by the wireless communication device, a sequence from a common sequence pool based on the integer value, where the common sequence pool has a nested structure of sequences which map different length information bit streams with the same most significant bit or bits to the same sequences; and transmitting, by the wireless communication device, a non-coherent transmission indicating the sequence.

In another aspect of the disclosure, a method of wireless communication includes transmitting, by a wireless communication device, common sequence pool configuration information; receiving, by the wireless communication device, a non-coherent transmission, the non-coherent transmission encoded based on the common sequence pool configuration information; decoding, by the wireless communication device, the non-coherent transmission based on the common sequence pool configuration information.

In an additional aspect of the disclosure, an apparatus configured for wireless communication is disclosed. The apparatus includes at least one processor, and a memory coupled to the at least one processor. The at least one processor is configured to transmit common sequence pool configuration information; receive a non-coherent transmission, the non-coherent transmission encoded based on the common sequence pool configuration information; decode the non-coherent transmission based on the common sequence pool configuration information.

In an additional aspect of the disclosure, an apparatus configured for wireless communication is disclosed. The apparatus includes means for transmitting common sequence pool configuration information; means for receiving a non-coherent transmission, the non-coherent transmission encoded based on the common sequence pool configuration information; means for decoding the non-coherent transmission based on the common sequence pool configuration information.

In an additional aspect of the disclosure, a non-transitory computer-readable medium stores instructions that, when executed by a processor, cause the processor to perform operations including transmitting, by a wireless communication device, common sequence pool configuration information; receiving, by the wireless communication device, a non-coherent transmission, the non-coherent transmission encoded based on the common sequence pool configuration information; decoding, by the wireless communication device, the non-coherent transmission based on the common sequence pool configuration information.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
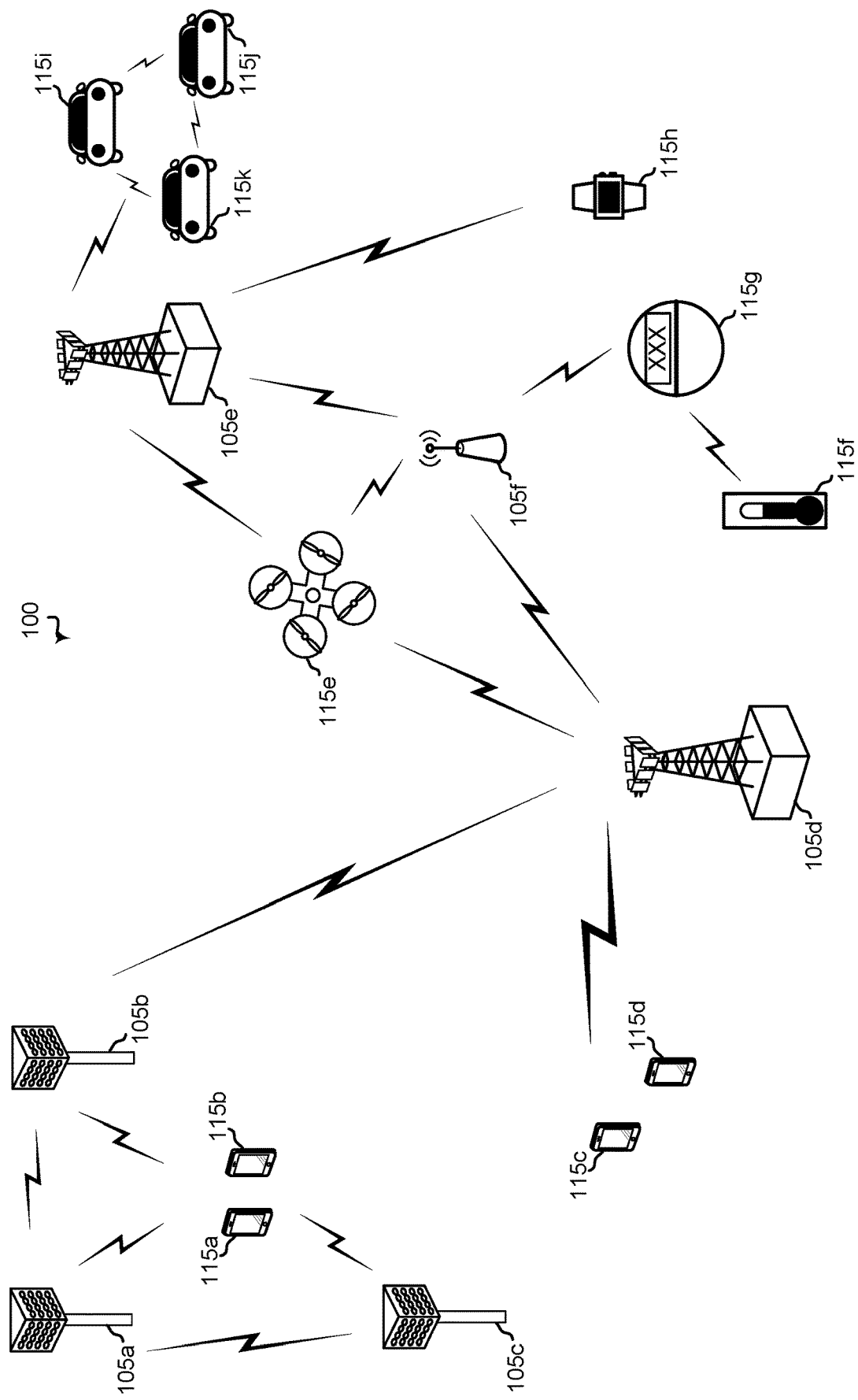
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
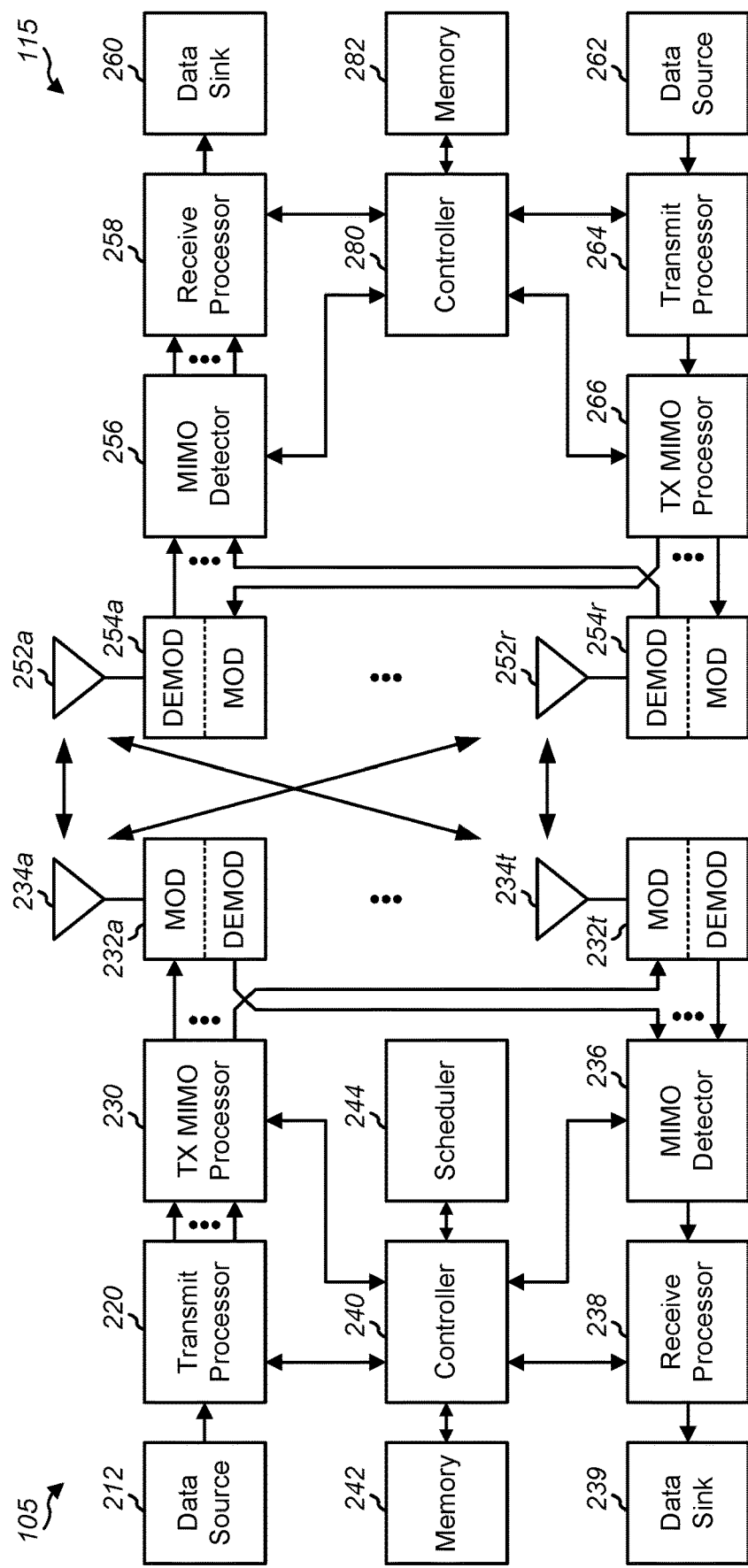
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-7, 13 and 14, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
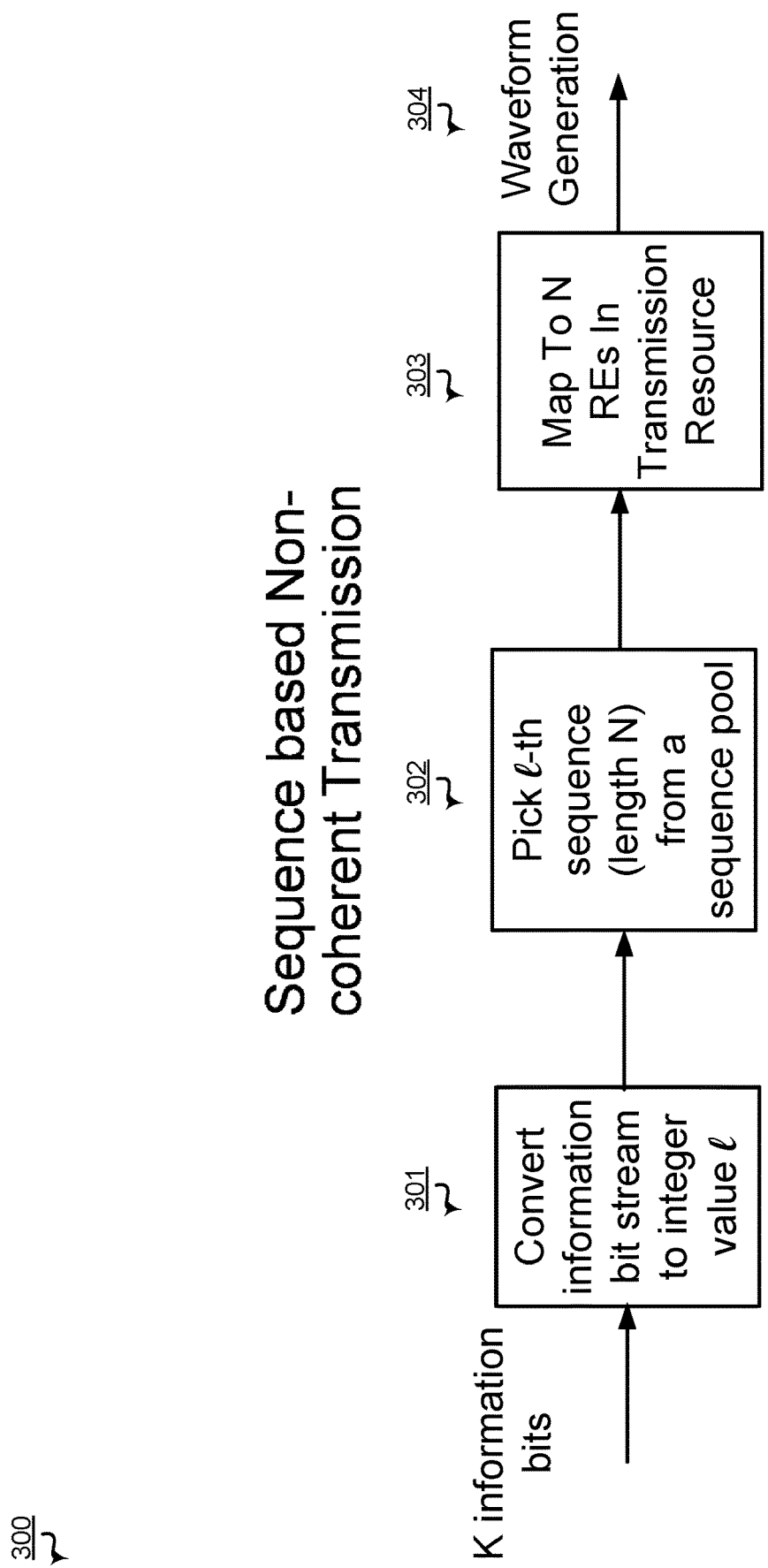
FIG. 3A is a diagram illustrating an example of information elements for reference signal (RS) information.

FIG. 3A illustrates an example flow diagram 300 for the generation of sequence based non-coherent transmissions. In FIG. 3A, a high level overview for generation of sequence based non-coherent transmissions is provided. Sequence based non-coherent transmissions differ from coherent transmissions in that they do not include a reference signal in the transmission and instead a sequence is used to encode/decode the data.

At 301, an information bit stream is converted to an integer value l. For example, a string of zeros and ones are translated from binary (e.g., 010) to an integer (e.g., 2). At 302, a sequence pool is generated based on a size or length of the string of bits, and the sequence is selected from the sequence pool based on the integer. For example, when the string is 3 bits long, the sequence pool may be two to the power of the length of the string of bits, that is 2^3, or 8 sequences in size. Each sequence may have a length of N, such as $N_{symbols}$.

At 303, the selected sequence is mapped to a number (N) of Resource Elements (REs) in a transmission resource or resources. To illustrate, the sequence of tones for the N OFDM symbols are mapped to REs, $N_{REs}$. At 304, a waveform is generated based on the mapping of the REs and the tones thereof.

Figure 3B:
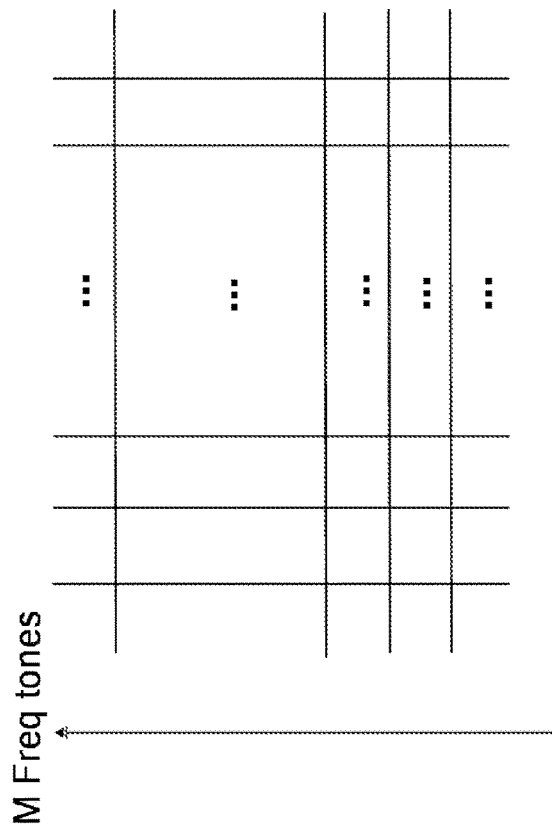
FIG. 3B is a diagram illustrating an example of information elements for reference signal (RS) information.

FIG. 3B illustrates an example of sequence pool 350 for a PUCCH. In FIG. 3B, the sequence pool 350 is an array of $N_{symbols}*M_{tones}$ codepoints/sequences, where $N_{symbols}$ is the number of OFDM symbols and M is the number of tones. During operation, a transmitting device may generate a sequence pool with $N_{symbols}*M_{tones}$ codepoints/sequences, where $N_{symbols}$ is the number of OFDM symbols and $M_{tones}$ is the number of tones as illustrated in FIG. 3B. For a PUCCH with a payload size of K bits, a codebook with size of 2^K is generated based on picking 2^K codepoints from the above $N_{symbols}*M_{tones}$ codepoints/sequences of the sequence pool. To transmit a payload of K bits, i.e., $b_0 b_1 b_2 \ldots b_{K-1}$, a device converts the payload bit stream $b_0 b_1 b_2 \ldots b_{K-1}$ into an integer number k, then transmit the kth codepoint in the constructed codebook.

Figure 3C:
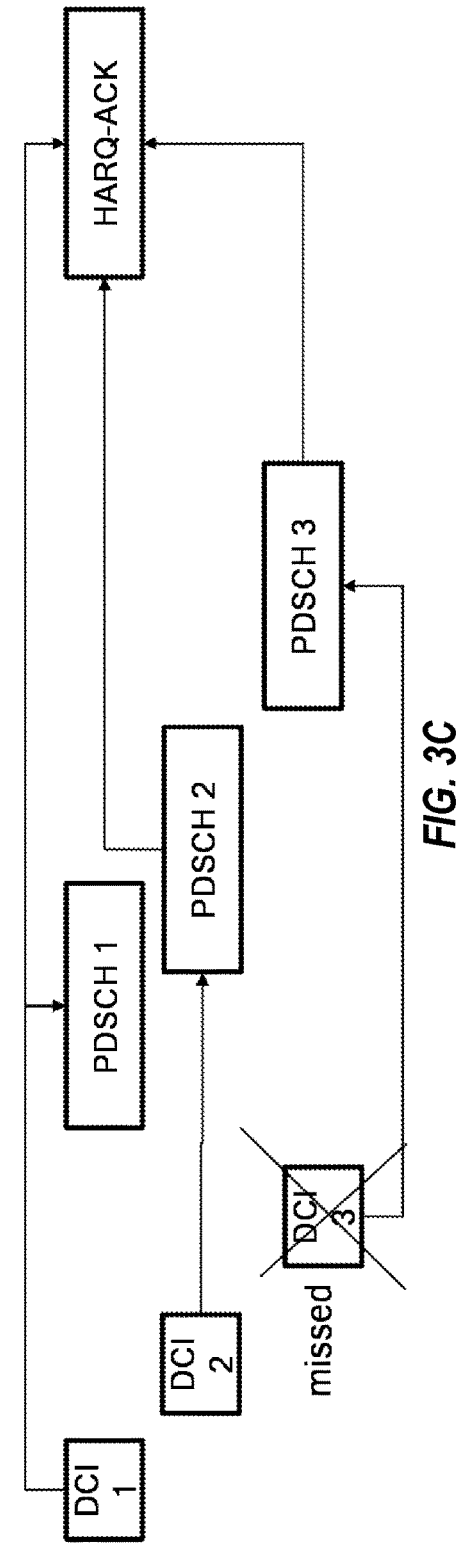
FIG. 3C is a diagram illustrating an example of information elements for reference signal (RS) information.

FIG. 3C illustrates an example of communications illustrating hybrid automatic repeat request (HARQ) feedback issues. In FIG. 3C, block diagram 360 of a scenario is provided which illustrates that HARQ-ACK feedback suffers from missing a last DCI transmission of a HARQ feedback window.

HARQ feedback can have decoding errors when any DCI is missed. To illustrate, when a DCI is missed, as opposed to unsuccessfully decoded DCI or PDSCH, the UE may not provide feedback for the DCI/PDSCH, and thus when the base station goes to decode the HARQ feedback, one or more bits are missing which causes decode errors.

In order to mitigate some such missed DCI errors, a DCI counter was added to DCI messages, i.e., DAI (downlink assignment index). The DAI is a counter which indicates how many DCIs have been sent, or which number DCI the current one is. However, such a system is still susceptible to missing a last DCI or multiple last DCIs. To illustrate, if a second DCI of a three DCI sequence is missed, the UE can determine three DCIs were sent based on a counter of the third DCI and that three feedback bits are needed. Alternatively, if a last DCI of a three DCI sequence is missed, the UE is unaware there are three DCI to report even if the DCI includes a counter.

As an illustration of an error caused by missing a last DCI, if the third DCI (DCI 3) is missed, the UE feedback is two bits of feedback (ACK/NACK) instead of three bits of feedback (ACK/NACK). However, a base station is expecting UE feedback of three bits of feedback corresponding to the three sent DCIs. Due to the HARQ-ACK codebook size mismatch, the base station cannot decode the feedback and an error is generated. Resolving such an error utilizes network overhead, increases latency, and reduces throughput.

The techniques described herein enable a transmitting device to encode and decode sequence based non-coherent transmissions using a single, common sequence pool. Using the common sequence pool results in processing and operational efficiencies, because dedicated codebooks/sequences are not generated for each transmission or stored in a memory based on a bit length of the bit stream. The techniques described herein further enable a transmitting device to encode data in such a way that a receiving device need not know how many bits to expect or can expect the wrong number of bits and still be able to decode the transmission. Thus, the techniques described herein enable a device to miss a last DCI or DCIs and still generate feedback (e.g., HARQ feedback) which is decodable by a receiving device. Additionally, the techniques described herein further increase transmission efficiency in when using sequence based non-coherent transmissions, HARQ feedback, or both.

Figure 4:
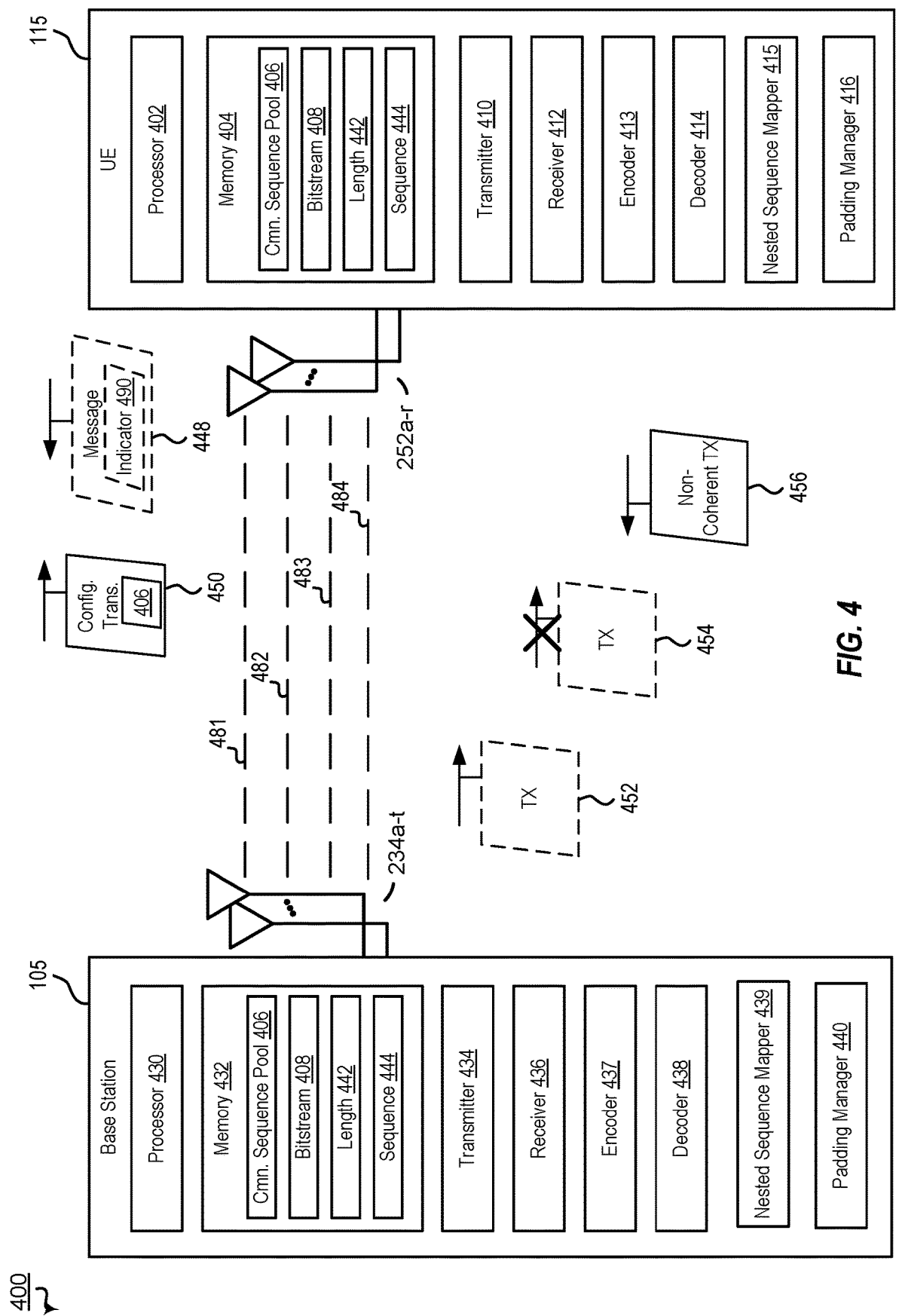
FIG. 4 is a block diagram illustrating an example wireless communication system enhanced non-coherent transmission operations in accordance with aspects of the present disclosure according to one or more aspects.

FIG. 4 illustrates an example of a wireless communications system 400 that supports enhanced non-coherent transmission operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105 and a UE 115. Enhanced non-coherent transmission operations may include use of a common sequence pool for sequence based mapping where the common sequence pool has a "nested" structure. Use of the common sequence pool with the nested structure may improve performance in low signal-to-noise ratio (SNR) operating conditions. For example, the non-coherent transmissions may not include reference signals (e.g., DMRS) and thus have reduced overhead and increased data capacity and throughput. Also, in some operating conditions (e.g., low SNR regimes, such as SNRs from −16 to −4 dB), non-coherent transmissions may have increased channel estimation quality performance and channel coding. Thus, network and device performance can be increased.

UE 115 and base station 105 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated suing MAC-CE transmissions, RRC transmissions, SCI (sidelink control information), transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, nested sequence mapper 415, padding manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store common sequence pool data 406, bit stream data 408, length data 442, sequence data 444, settings data, or a combination thereof, as further described herein.

The common sequence pool data 406 includes or corresponds to data associated with a common sequence pool for mapping bit streams to sequences. The common sequence pool data 406 may include or correspond to a matrix or array of values or to list of sequences to which different length bit streams can use to map or select sequences. The common sequence pool may be generated by the UE 115 or received from a network (e.g., base station 105), region, or standard.

The bit stream data 408 includes or corresponds to data associated with information bits to be transmitted. The data may include feedback data or transmission data. The bit stream data 408 may include original (e.g., unadjusted or unpadded) bit stream strings which are less than a total number of bits (e.g., $N_{total\ bits}$) supported by the devices and/or network, adjusted bit stream strings (e.g., padded or extended) bit stream strings which are equal to a length of total number of bits (e.g., $N_{total\ bits}$) supported by the devices and/or network, or both.

The length data 442 includes or corresponds to data associated with a length of the bit stream, a length of the sequence, a number of REs, or a combination thereof.

The sequence data 444 includes or corresponds to data associated with a sequence selected from a common sequence pool. The sequence data 444 may include a sequence of tones for a number of OFDM symbols. Additionally, or alternatively, the sequence data 444 may include a sequence of REs available for a particular transmission. The settings data includes or corresponds to settings and/or conditions data for sequence based non-coherent transmission and common sequence pool usage.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Nested sequence mapper 415 may be configured to determine and perform nested sequence mapping operations. For example, nested sequence mapper 415 may be configured to generate a common sequence pool with a nested structure, such as the common sequence pool data 406. Alternatively, the nested sequence mapper 415 may access or retrieve a particular common sequence pool from the common sequence pool data 406 based on an indication from a network device or based on an operating region or standard. As another example, the nested sequence mapper 415 may be configured to determine and select a sequence from a common sequence pool based on an integer value associated with a bit stream. The nested sequence mapper 415 may be configured to further convert the bit stream (e.g., bit value sequence) to the integer value.

Padding manager 416 may be configured to determine and perform least significant digit padding operations for bit stream sequences. For example, padding manager 416 may be configured to add one or more zeros to the bit stream to generate an adjusted bit stream. To illustrate, for a common sequence pool with a length of $N_{sequences}$, and a bit stream with a length of $N_{sequences}-2$, the padding manager 416 adds two bits with zero values to an end or right side of the bit stream.

Base station 105 includes processor 430, memory 432, transmitter 434, receiver 436, encoder 437, decoder 438, nested sequence mapper 439, padding manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store common sequence pool data 406, bit stream data 408, length data 442, sequence data 444, settings data, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. Nested sequence mapper 439 may include similar functionality as described with reference to nested sequence mapper 415. Padding manager 440 may include similar functionality as described with reference to padding manager 416.

During operation of wireless communications system 400, base station 105 may determine that UE 115 has enhanced sequence based non-coherent transmission capability. For example, base station 105 may transmit a message 448 that includes an enhanced sequence based non-coherent transmission indicator 490 (e.g., a common sequence pool configuration for sequence based non-coherent transmission operation). Indicator 490 may indicate enhanced sequence based non-coherent transmission or a particular type or mode of sequence based non-coherent transmission. In some implementations, a base station 105 sends control information to indicate to UE 115 that sequence based non-coherent transmission and/or a particular type of sequence based non-coherent transmission is to be used. For example, in some implementations, message 448 (or another message, such as configuration transmission 450) is transmitted by the base station 105. The configuration transmission 450 may include or indicate to use sequence based non-coherent transmission or to adjust or implement a setting of a particular type of sequence based non-coherent transmission. For example, the configuration transmission 450 may include 444, as indicated in the example of FIG. 4, 442, or both.

During operation, devices of wireless communications system 400, perform sequence based non-coherent transmission. For example, the wireless communication devices (e.g., a base station and UE) exchange transmissions via a downlink channel, an uplink channel, a sidelink channel, or a combination thereof. In the example of FIG. 4, the base station 105 optionally transmits a first transmission 452 to the UE 115. The first transmission 452 may include or correspond to a coherent transmission or a non-coherent transmission, such as a sequence based non-coherent transmission. In a particular example, the first transmission 452 is a first DCI, as explained further with reference to FIG. 5. The UE 115 may receive the first transmission 452 and may determine feedback for the first transmission 452.

Additionally, the base station 105 optionally transmits a second transmission 454 to the UE 115. The second transmission 454 may include or correspond to a coherent transmission or a non-coherent transmission, such as a sequence based non-coherent transmission. In a particular example, the second transmission 454 is a second DCI, as explained further with reference to FIG. 5. The UE 115 may not receive the second transmission 454 and may not determine feedback for the second transmission 454 as shown in the example shown in FIG. 4.

The UE 115 generates a non-coherent transmission 456. For example, the UE 115 generates a sequence based non-coherent transmission using a common sequence pool from the common sequence pool data 406. The UE 115 can generate the non-coherent transmission 456 based on any length bit stream supported by the common sequence pool. When using the non-coherent transmission 456 to report feedback, such as HARQ feedback, the non-coherent transmission 456 may include or correspond to a PUCCH transmission, such as a UCI. The UE 115 may map a variable length bit stream indicating the HARQ feedback to a sequence of the common sequence pool to generate the non-coherent transmission 456. Detailed examples of such generation and common sequence pools are further described with reference to FIGS. 5-7.

The base station 105 receives the non-coherent transmission 456 and attempts to decode the non-coherent transmission 456. The base station 105 may successfully decode the non-coherent transmission 456 using the common sequence pool. For example, the base station 105 may be able to use the common sequence pool to decode an expected 2-bit HARQ feedback based on transmissions 452 and 454 even though the UE 115 generated the HARQ feedback back on the first transmission 452 only and the HARQ feedback is a 1-bit HARQ feedback.

Accordingly, the UE 115 and base station 105 may be able to more effectively generate and transmit sequence based non-coherent transmissions. Thus, FIG. 4 describes enhanced sequence based non-coherent transmission. Using enhanced sequence based non-coherent transmission operations may enable improvements when devices are operating in a particular operation conditions, such as low SNR regimes. Performing enhanced sequence based non-coherent transmission operations for providing feedback (e.g., HARQ feedback) enables increased resilience and reduced decoding errors when transmissions (e.g., DCIs) are missed and thus, UE and network performance experience increased throughput and reduced errors and latency.

Figure 5:
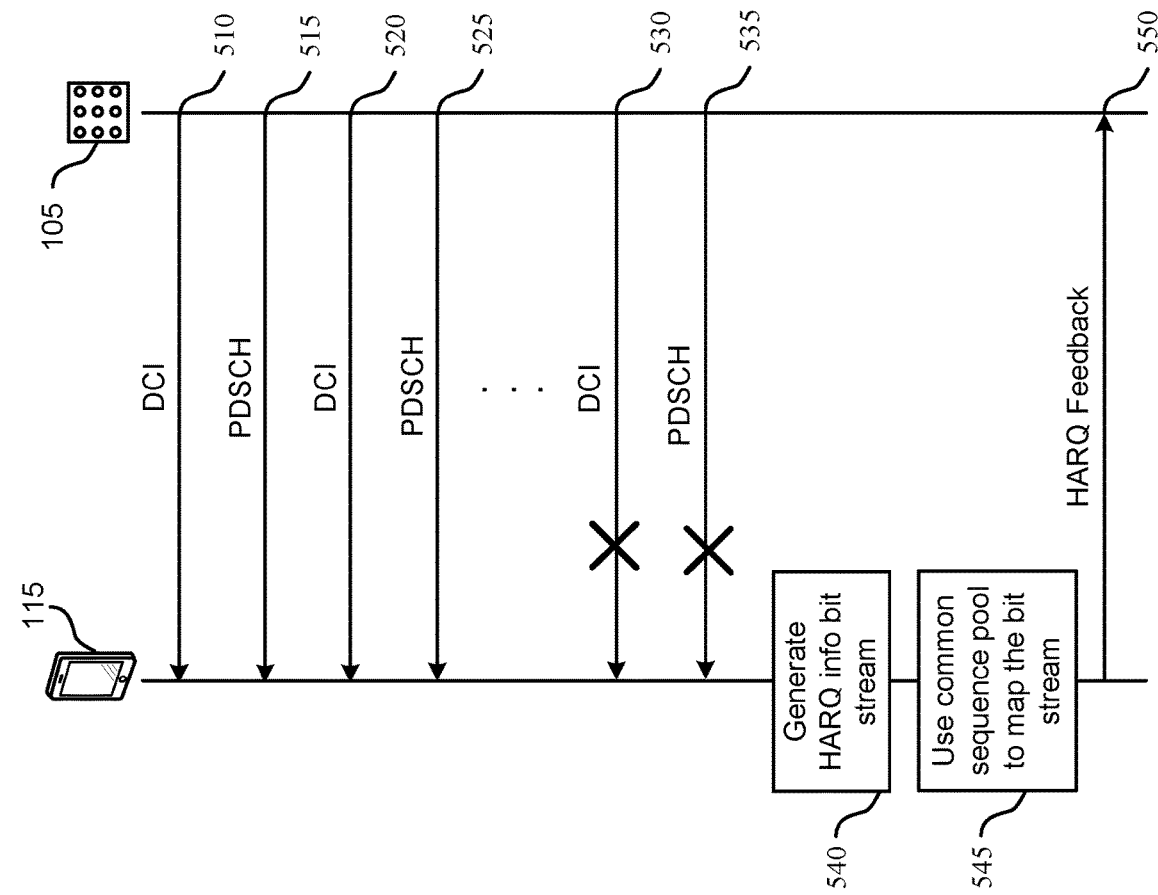
FIG. 5 is a ladder diagram illustrating an example of non-coherent transmission operations for hybrid automatic repeat request (HARQ) feedback according to some aspects.

FIG. 5 illustrates an example of a ladder diagram for non-coherent transmission operations for HARQ feedback according to some aspects. Referring to FIG. 5, FIG. 5 is a ladder diagram 500 of transmitting HARQ feedback information via a non-coherent transmission that has been generated based on using a nested common sequence pool, that is a common sequence pool with a nested structure or arrangement of sequences ordered by Most Significant Bits (MSBs) (such as opposed to binary sequence) and where each sequence can map to multiple binary strings with common MSBs. Example of such nested common sequence pool include common sequence pool data 406 of FIG. 4 or the example common sequence pools of FIGS. 6 and 7. In the example of FIG. 5, the ladder diagram 500 illustrates a UE 115 and a network entity, such as base station 105 and providing uplink HARQ feedback. In other implementations, other combinations of wireless communication devices may be used and such operations may be applied to feedback for uplink or sidelink communications, or alternatively may be used for data transmissions and/or other control transmissions.

At 510, the base station 105 (such as a gNB) transmits a first DCI to the UE 115. For example, the base station 105 transmits a first PDCCH transmission to the UE 115 which signals or schedules a corresponding first PDSCH transmission. As illustrated in the example of FIG. 5, the UE 115 may receive the first PDCCH and successfully decode the first PDCCH to determine that the first PDSCH is to be transmitted.

At 515, the base station 105 transmits the first PDSCH transmission to the UE 115. For example, the base station 105 generates and transmits a data transmission via a first PDSCH resource. The UE 115 may monitor for the first PDSCH based on the first PDCCH, and the UE 115 may receive the first PDSCH and successfully decode the first PDSCH, as illustrated in the example of FIG. 5.

At 520, the base station 105 transmits a second DCI to the UE 115. For example, the base station 105 transmits a second PDCCH transmission to the UE 115 which signals or schedules a corresponding second PDSCH transmission. As illustrated in the example of FIG. 5, the UE 115 may receive the second PDCCH and successfully decode the second PDCCH to determine that the second PDSCH is to be transmitted.

At 525, the base station 105 transmits the second PDSCH transmission to the UE 115. For example, the base station 105 generates and transmits a second data transmission via a second PDSCH resource. As illustrated in the example of FIG. 5, the UE 115 may monitor for the second PDSCH based on the second PDCCH and receive the second PDSCH and successfully decode the second PDSCH. In response to such actions, the UE 115 may generate feedback information for the second PDCCH/PDSCH, that is, the UE 115 may generate a feedback bit indicating the status of the decode for the second PDSCH. As an illustrative example, the UE 115 may generate one bit (such as with a bit value of 1) indicating a successfully decode (ACK) for the second PDSCH because the UE 115 successfully received (and decoded) the DCI.

If the UE 115 received the second DCI, but was unable to successfully decode the second PDSCH, the UE 115 may add a zero bit (NACK) to the feedback information based on the unsuccessful decode of the second PDSCH. Additionally, if there were one or more intervening DCIs or PDSCHs or the UE 115 missed the first DCI, the UE 115 may add feedback bits for such communications even though the DCIs were missed based on a counter of the DCI. To illustrate, a DAI type counter may indicate that X number of DCIs were sent and then the UE 115 may determine to add a particular number of bits to the feedback information based on any missed DCIs in a middle of the HARQ feedback window.

At 530, the base station 105 transmits a third DCI to the UE 115. For example, the base station 105 transmits a third PDCCH transmission to the UE 115 which signals or schedules a corresponding third PDSCH transmission. As illustrated in the example of FIG. 5, the UE 115 may not receive the third PDCCH and thus, may not be aware of the third PDCCH or even attempt to decode the third PDCCH.

At 535, the base station 105 transmits the third PDSCH transmission to the UE 115. For example, the base station 105 generates and transmits a third data transmission via a third PDSCH resource. As illustrated in the example of FIG. 5, the UE 115 may not be aware of the third PDSCH because it did not receive the third PDCCH, and the UE 115 may not even monitor for the third PDSCH or attempt to decode the third PDSCH. In response to such actions, the UE 115 may not generate feedback information for the third PDCCH/PDSCH, that is may not generate a feedback bit indicating the status of the decode for the third PDSCH. As an illustrative example, the UE 115 may not generate a zero bit indicating an unsuccessful decode (NACK) for the third PDSCH because the UE 115 missed the DCI and is unaware of the third PDSCH entirely. As the UE 115 missed the last DCI, the UE 115 cannot use a DAI thereof to determine how many bits to include or how many bits should be in the HARQ feedback.

In between 525 and 530, one or more other DCI and PDSCH transmissions may be communicated. Additionally, in between any of 510 and 530, one or more other operations and/or communications may occur, such as uplink transmissions, channel reporting, communications to other devices of this network or other networks, etc.

At 540, the UE 115 generates a HARQ information bit stream based on the previous transmissions. For example, the UE 115 generates a bit stream for or indicating HARQ feedback, such as ACKs or NACKs, for each PDSCH it is aware of and whether the decode was successful or not. The UE 115 may generate the bit stream after the first PDSCH and then adjust the bit stream based on further communications, or the UE 115 may generate the bit stream after all the communications of a HARQ feedback window are completed, such as during a HARQ feedback delay period or HARQ feedback time gap.

At 545, the UE 115 translates or maps the HARQ information bit stream to a sequence for non-coherent transmission based on a common sequence pool. The common sequence pool, as noted above, is used for information bit streams of all sizes/lengths. That is, the UE 115 does not generate a separate sequence pool or codebook for each information bit stream to map based on a length (i.e., number of bits) of the bit stream. The common sequence pool has a nested structure which enables the common sequence pool to accommodate information bits of different sizes. The common sequence pool may accommodate such different length bit streams via padding or set common sequence pool structures.

Figure 6:
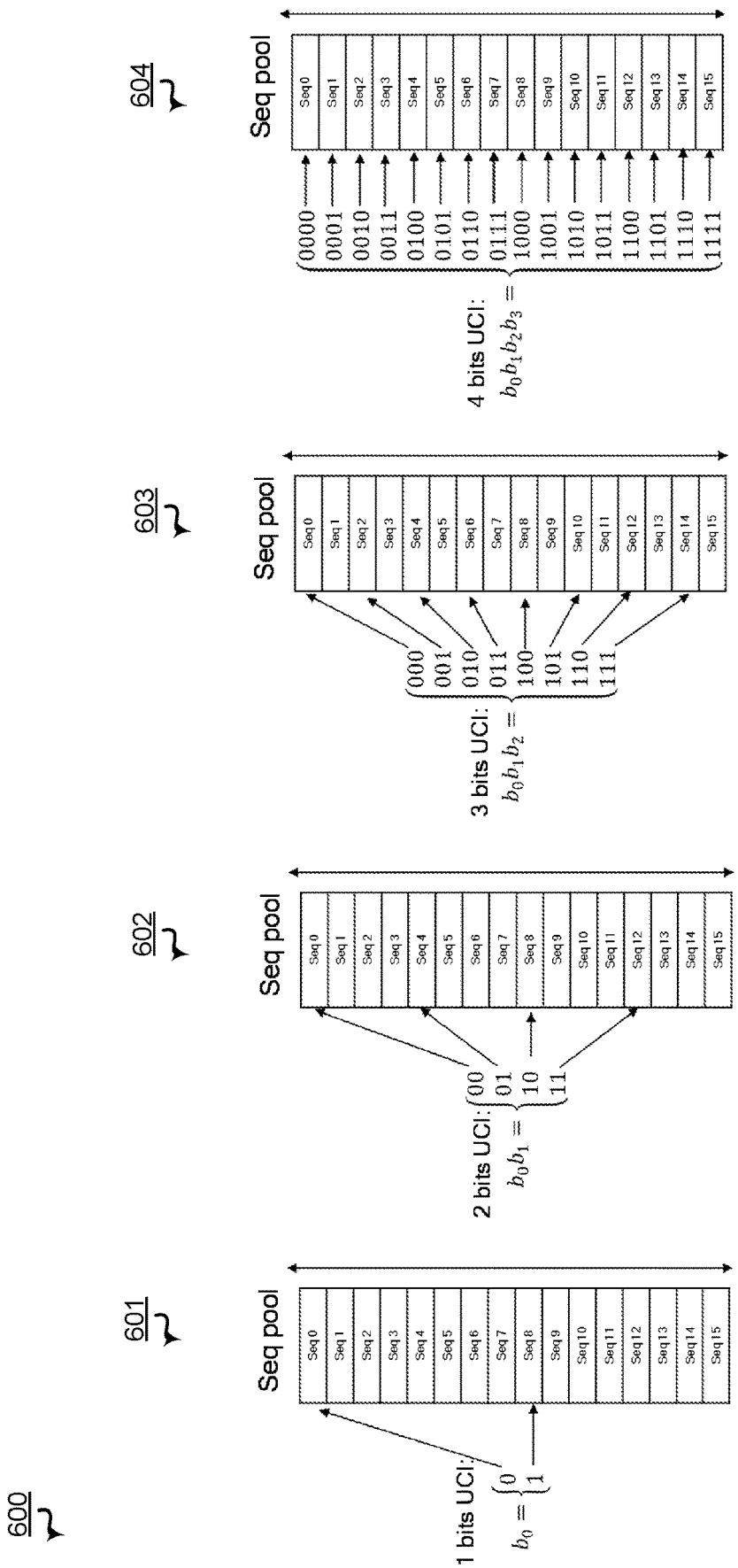
FIG. 6 is a block diagram of various bit stream length mappings for a first example common sequence pool according to some aspects.
Figure 7:
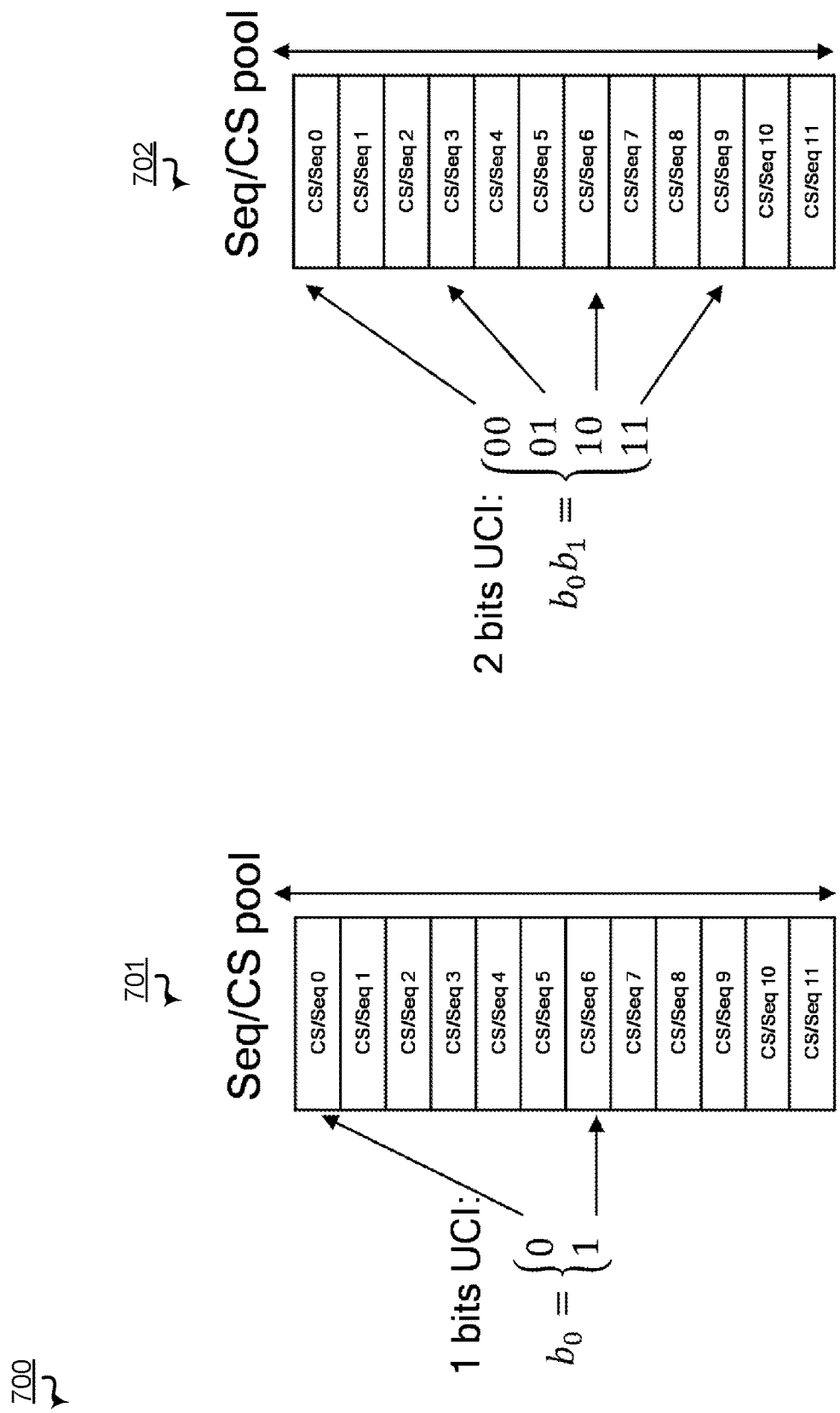
FIG. 7 is a block diagram of various bit stream length mappings for a second example common sequence pool according to some aspects.

Additionally, the nested arrangement of the common sequence pool groups bit stream strings by most significant bits as opposed to integer values, as illustrated and described further with reference to FIGS. 6 and 7. As a non-limiting, illustrative example, a first sequence for a bit stream string of 0 is next to a second sequence for a bit stream string of 0001 of a common sequence pool to accommodate 4-bit feedback as opposed to a third sequence for a bit stream string of 1. In addition, bit stream strings of 0, 00, 000, and 0000 all map to the same sequence of the common sequence pool.

At 550, the UE 115 transmits HARQ feedback information to the base station 105. For example, the UE 115 transmits a PUCCH transmission indicating the HARQ feedback. The PUCCH may include or correspond to a HARQ feedback transmission. The HARQ feedback information indicates whether or not the UE 115 received each DCI transmission even if the UE 115 missed the last DCI or DCI and/or if the UE 115's feedback information is not the same length as the number of DCI's sent.

Thus, in the example in FIG. 5, the UE uses a common sequence pool with a nested arrangement to provide HARQ feedback which enables decoding protection against missed DCIs, such as a last DCI or DCIs.

FIGS. 6 and 7 illustrate examples of common sequence pools with nested arrangements and various bit stream length mappings. Referring to FIG. 6, FIG. 6 is a block diagram of various bit stream length mappings for a common sequence pool 600 according to some aspects. In the example of FIG. 6, the block diagram illustrates four bit stream length mappings for the common sequence pool 600 for bit stream lengths of 1 bit, 2 bits, 3 bits, and 4 bits, 601-604 respectively.

As illustrated in FIG. 6, the common sequence pool 600 has 16 sequences (Seq 0 to Seq 15), or $2^{N_{max\ bits}}$ number of sequences where $N_{max\ bits}$ is the largest length of bits the common sequence pool 600 can accommodate, which is 4 in this example. The common sequence pool 600 has an arrangement of sequences that corresponds to MSB organization and can be most easily seen by the bit stream length mapping for the 4-bit length bit stream 604.

Referring to the bit stream length mapping for the 1-bit length bit stream 601, the bit stream mapping utilizes two sequences, which are eight sequences apart, to represent the 1-bit bit stream string possibilities of 0 and 1. That is, sequence 0 is used for a bit stream string of 0 and sequence 8 is used for a bit stream string of 1.

Referring to the bit stream length mapping for the 2-bit length bit stream 602, the bit stream mapping utilizes four sequences, which are four sequences apart, to represent the 2-bit bit stream string possibilities of 00, 01, 10, and 11. That is, sequence 0 is used for a bit stream string of 00, sequence 4 is used for a bit stream string of 01, sequence 8 is used for a bit stream string of 10, and sequence 12 is used for a bit stream string of 11. As compared to the 1-bit mapping of 601, the values of 0 and 00 map to the same sequence (sequence 0) and the values of 1 and 10 map to the same sequence (sequence 8).

Referring to the bit stream length mapping for the 3-bit length bit stream 603, the bit stream mapping utilizes eight sequences ($2^3$ sequences), which are two sequences apart, to represent the 3-bit bit stream string possibilities of 000, 001, 010, 011, etc. That is, sequence 0 is used for a bit stream string of 000, sequence 2 is used for a bit stream string of 001, sequence 4 is used for a bit stream string of 010, etc. As compared to the 1-bit mapping of 601 and the 2-bit mapping of 602, the values of 0, 00, and 000 map to the same sequence (sequence 0); the values of 1, 10, and 100 map to the same sequence (sequence 8); and the values of 11 and 110 map to the same sequence (sequence 12).

Referring to the bit stream length mapping for the 4-bit length bit stream 604, the bit stream mapping utilizes all sixteen sequences ($2^4$ sequences), which have no spacing, to represent the 4-bit bit stream string possibilities of 0000, 0001, 0010, 0011, etc. That is, sequence 0 is used for a bit stream string of 0000, sequence 1 is used for a bit stream string of 0001, sequence 2 is used for a bit stream string of 0010, etc. As compared to the lesser bit mappings of 601-603, the values of 0, 00, 000, and 0000 map to the same sequence (sequence 0) and the values of 1, 10, 100, and 1000 map to the same sequence (sequence 8).

In some implementations, a transmitting device, such as a UE, may adjust a bit stream in the process of generating a non-coherent transmission. For example, a UE may lengthen a bit stream sequence by adding, often referred to as padding, bits to the sequence to increase a length/number of bits of the bits stream so that the bit stream (i.e., a sequence corresponding to the bit stream) can be decoded by a receiving device. As an illustrative example, a particular type/value bit is added, such as a 0 value bit, to indicate a NACK, also referred to as a dummy NACK. Adding such bits prevents a mismatch between a sent number of bits/sequence and a number of bits/sequence expected by the receiving device.

In one illustrative example, a UE is configured to process/support bit stream lengths of up to N number of bits. During operations, a UE generates a bit stream of K bits. The UE determines that the current bits of the bit stream are the MSB (left most bits in the string), and then pads the bit stream by adding bits until the adjusted bit stream has a length of $N_{bits}$ bits. To illustrate, the UE zero pads the bit stream of K length to generate an adjusted bit stream of $N_{bits}$ length by adding N-K zeros as Least Significant Bits (LSBs) to the bit stream (i.e., to the right of the MSBs of the bit stream). The UE may then convert the adjusted bit stream (e.g., the zero padded N-bits bit stream) into an integer number/with reference to 301 of FIG. 3A. The UE then uses the determined integer number/to select a corresponding sequence in the common sequence pool, such as the l-th sequence in the common sequence pool with reference to 302 of FIG. 3A. The UE then maps the sequence (e.g., sequence of tones for corresponding OFDM symbols) to REs and generates a waveform based on or to indicate the sequence with reference to 303 and 304 of FIG. 3A.

The above example can also be described in reference to FIGS. 5 and 6. To illustrate, the base station schedules four PDSCHs, but the UE may only receive the first DCI and miss the subsequent three DCIs. The UE generates a bit stream to indicate the HARQ feedback of 1-bit with a string of 1. The UE then zero pads the bit stream from a 1-bit length to a 4-bit length by zero padding three bits to make $b_0$->$b_0$000 (e.g., 1 to 1000). The UE then converts the zero padded 4-bit length bit stream into an integer number i (8), and then selects the corresponding sequence for the integer number/in the common sequence pool 600, such as the l-th (8th) sequence in the common sequence pool 600. The UE then transmits a waveform generated based on the selected (8th) sequence of the common sequence pool 600. The base station which was expecting a 4-bit sequence can correctly decode the 8th sequence. The base station determines that the HARQ feedback is a bit stream string of 1000 and the base station knows that the UE missed the last three DCIs and is able to decode the original bit stream value of 1 or a 1-bit bit stream value based on the nested structure of the common sequence pool 600 and padding. The rest of the padded zeros (or dummy NACKs) also correctly reflect that the UE missed the last three DCIs and the corresponding PDSCHs.

Referring to FIG. 7, FIG. 7 is a block diagram of various bit stream length mappings for a common sequence pool 700 according to some aspects. In the example of FIG. 7, the block diagram illustrates two bit stream length mappings for the common sequence pool 700 for bit stream lengths of 1 bit and 2 bits, 701 and 702 respectively. As compared to the example of FIG. 6, a length (e.g., a number of rows) of the common sequence pool 700 is not based on a power of 2 and/or a maximum number of bits supported (e.g., $N_{max\ bits}$), but rather a number L.

As illustrated in FIG. 7, the common sequence pool 700 has 12 sequences (Seq 0 to Seq 11), for the L number of sequences in the common sequence pool 700. Similar to FIG. 6, the common sequence pool 700 can accommodate $N_{bits}$ length of bits bit streams, which is 4 in this example. The common sequence pool 700 has an arrangement of sequence that corresponds to MSB organization.

Referring to the bit stream length mapping for the 1-bit length bit stream 701, the bit stream mapping utilizes two sequences, which are six sequences apart, to represent the 1-bit bit stream string possibilities of 0 and 1. That is, sequence 0 is used for a bit stream string of 0 and sequence 6 is used for a bit stream string of 1.

Referring to the bit stream length mapping for the 2-bit length bit stream 702, the bit stream mapping utilizes four sequences (2^2 sequences), which are three spaces apart, to represent the 2-bit bit stream string possibilities of 00, 01, 10, 11, etc. That is, sequence 0 is used for a bit stream string of 00, sequence 3 is used for a bit stream string of 01, sequence 6 is used for a bit stream string of 10, and sequence 9 is used for a bit stream string of 11. As compared to the 1-bit mapping of 701, the values of 0 and 00 map to the same sequence (sequence 0) and the values of 1 and 10 map to the same sequence (sequence 6).

In some implementations, a transmitting device, such as a UE, may map a bit stream to a sequence in the common sequence pool without generating an adjusted bit stream, such as without padding. For example, a network entity, region, or standard may specify a mapping or relationship between bit stream strings and sequences of the common sequence pool 700. For example, an equation or formula may be used to convert a bit stream string into a sequence value. Alternatively, a specific mapping information element or a look-up table may be used to indicate the mapping or relationship between bit stream strings and sequences. Similar to the padding method described above, the nested structure and mapping enables multiple bit stream sequences to map to a single or same sequence as shown in FIGS. 6 and 7. To illustrate with respect to FIG. 7, the values of 0 and 00 map to the same sequence (sequence 0) and the values of 1 and 10 map to the same sequence (sequence 6). Thus, a transmitting device may use a look-up table or perform calculations to convert bit stream strings into sequences which can account for missing a last DCI or DCIs. One example equation for FIG. 6 is l=bit2int($b_0 b_1 \ldots b_{K-1}$)*$2^{N-K}$. Another example equation for FIG. 7 is $$l = \text{bit2int}(b_0 b_1 \ldots b_{K-1}) * \left(\frac{L}{2^K}\right)$$

where L is the total number of sequences in the pool. In the above equations bit2int represents a conversion from bit stream to an integer value.

In other implementations, the UE may use adjusted bit streams (e.g., padded bit streams) to select a sequence from the common sequence pool 700, similar to the operations described with reference to FIG. 6.

Additionally, or alternatively, one or more operations of FIGS. 4-7 may be added, removed, substituted in other implementations. For example, in some implementations, the example steps of FIGS. 6 and 7 may be used together. To illustrate, the padding of FIG. 6 may be used with the common sequence pool 700 of FIG. 7. As another illustration, the mapping, such as the equation or look-up table of FIG. 7 may be used with the common sequence pool 600 of FIG. 6. As another example, some of the operations of FIGS. 4 and 5 may be used with the steps of any of FIGS. 6 and 7.

Figures 8, 9:
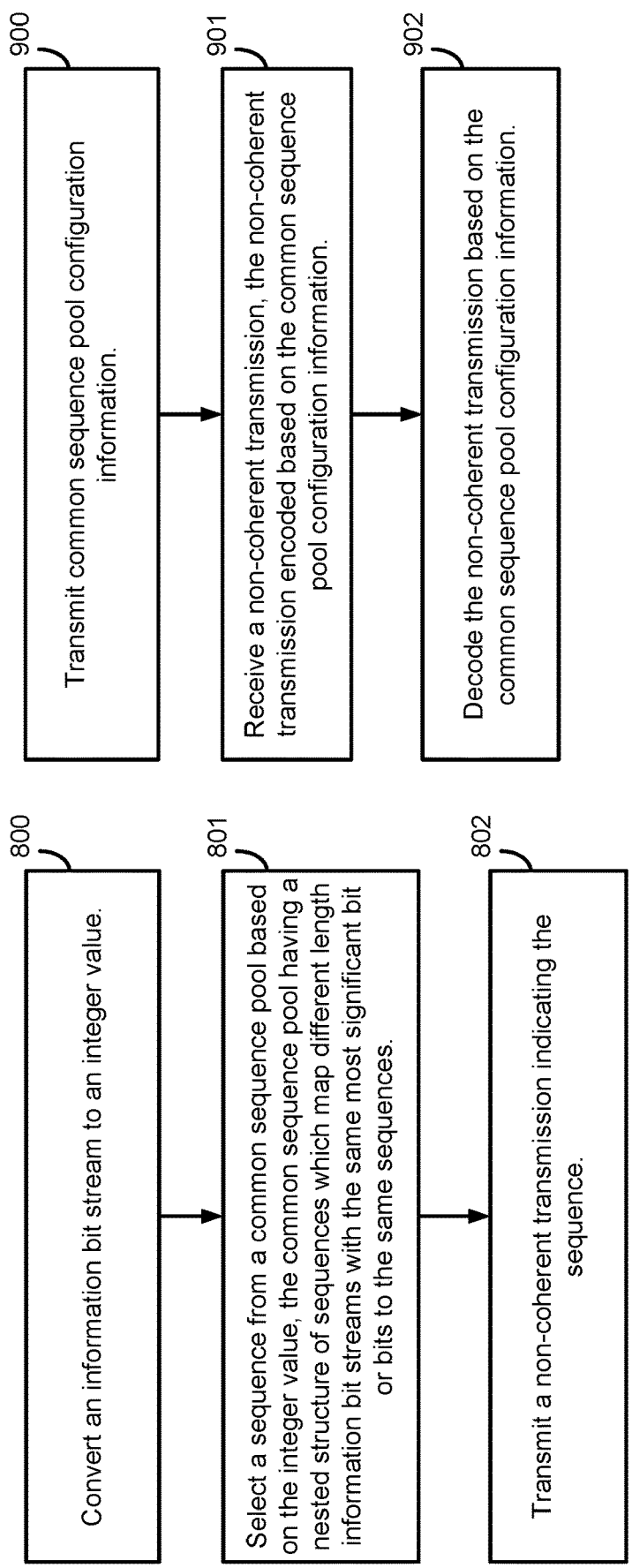
FIG. 8 is a flow diagram illustrating an example process that supports use of a common sequence pool for non-coherent transmissions according to one or more aspects.
FIG. 9 is a flow diagram illustrating an example process that supports use of a common sequence pool for non-coherent transmissions according to one or more aspects.
Figure 10:
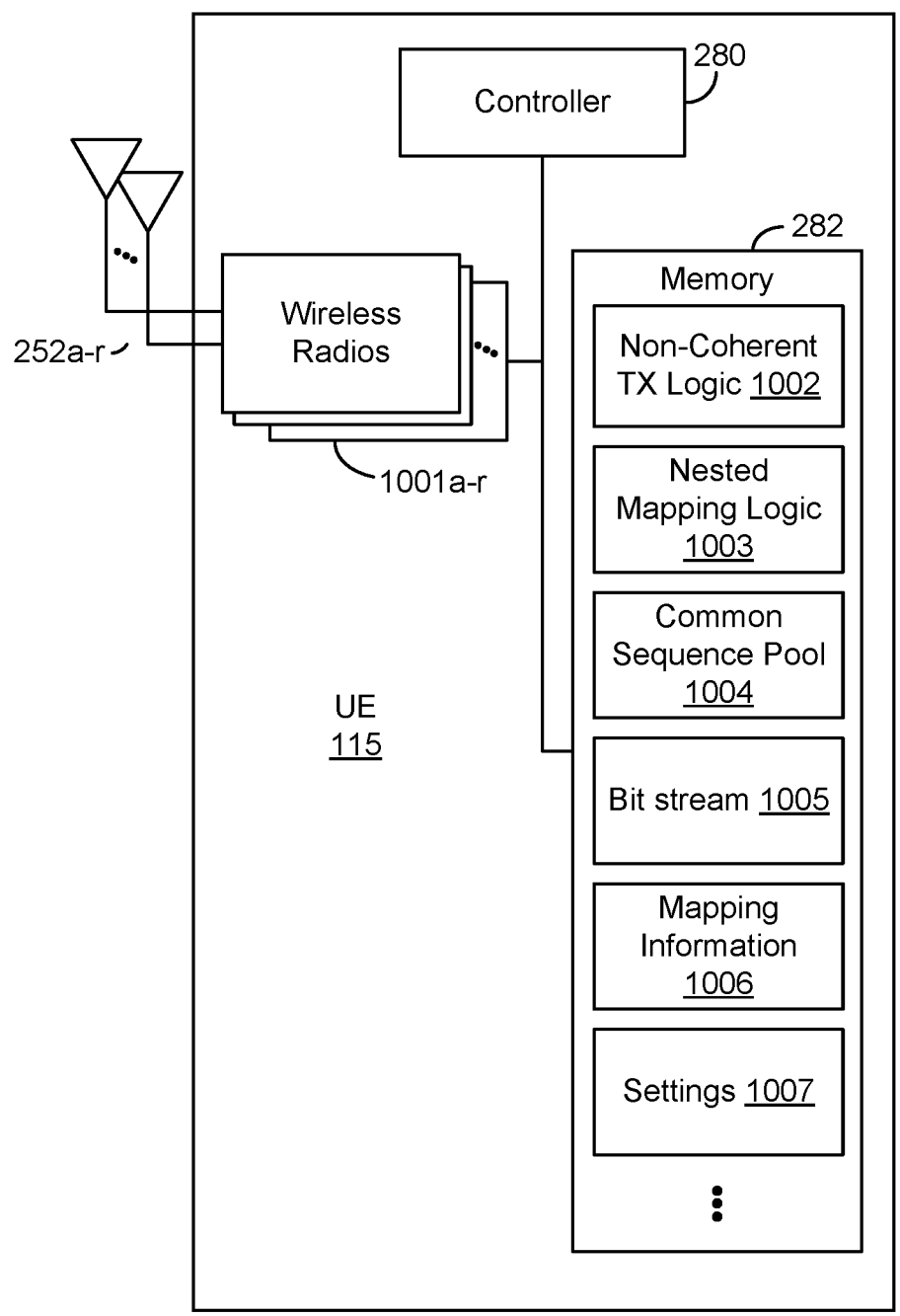
FIG. 10 is a block diagram of an example UE that supports use of a common sequence pool for non-coherent transmissions according to one or more aspects.

FIG. 8 is a flow diagram illustrating example blocks executed by a wireless communication device (e.g., a UE or base station) configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 10, memory 282 stores Non-coherent transmission logic 1002, nested mapping logic 1003, common sequence pool data 1004, bit stream data 1005, mapping information data 1006, and settings data 1007.

At block 800, a wireless communication device, such as a UE, converts an information bit stream to an integer value. For example, the UE 115 translates a bit stream string to an integer value, as described with reference to FIGS. 4-7. In some implementations, the bit stream to be converted is a padded or adjusted bit stream, as described with reference to FIGS. 4 and 6. In other implementations, the bit stream to be converted is an original or reduced length bit stream that is mapped to an integer value and/or corresponding sequence based on formula or look-up table, as described with reference to FIGS. 4 and 7.

At block 801, the UE 115 selects a sequence from a common sequence pool based on the integer value. The common sequence pool has a nested structure of sequences which map different length information bit streams with the same most significant bit or bits to the same sequences. For example, the UE 115 selects a sequence from the common sequence pool based on the determined integer value, as described with reference to FIGS. 4-7.

At block 802, the UE 115 transmitting, by the wireless communication device, a non-coherent transmission indicating the sequence. For example, the UE 115 generates a waveform based on mapping the selected sequence to REs and uses wireless radios 1001a-r and antennas 252a-r to transmit the waveform which indicates or includes the selected sequence and indicates the bit stream, as described with reference to FIGS. 4-7.

The wireless communication device (e.g., UE or base station) may execute additional blocks (or the wireless communication device may be configured further perform additional operations) in other implementations. For example, the UE 115 may perform one or more operations described above. As another example, the UE 115 may perform one or more aspects as presented below.

In a first aspect, the UE 115 generates the information bit stream based on successfully received messages and to indicate feedback information.

In a second aspect, alone or in combination with the first aspect, the UE 115 maps the sequence to one or more resource elements, where transmitting the non-coherent transmission includes generating a waveform indicating the sequence.

In a third aspect, alone or in combination with one or more of the above aspects, the one or more resource elements comprise a number of resource elements corresponding to the length of the sequence.

In a fourth aspect, alone or in combination with one or more of the above aspects, the non-coherent transmission includes or corresponds to a HARQ feedback transmission.

In a fifth aspect, alone or in combination with one or more of the above aspects, the sequence indicates feedback bits.

In a sixth aspect, alone or in combination with one or more of the above aspects, the non-coherent transmission does not include a reference signal.

In a seventh aspect, alone or in combination with one or more of the above aspects, the non-coherent transmission does not include a DMRS.

In an eighth aspect, alone or in combination with one or more of the above aspects, the UE 115: generates the information bit stream based on successfully received messages and to indicate feedback information; and pads the information bit stream with one or more zeros, wherein the one or more zeros represent the least significant bits.

In a ninth aspect, alone or in combination with one or more of the above aspects, the one or more zeros represent the least significant bits (e.g., the rightmost or last bits of the bit stream).

In a tenth aspect, alone or in combination with one or more of the above aspects, the UE 115 receives a DCI indicating a PDSCH transmission; and receives the PDSCH transmission.

In a twelfth aspect, alone or in combination with one or more of the above aspects, the UE 115: attempts to decode the PDSCH transmission; successfully decodes the PDSCH transmission; and generates a bit of the information bit stream based on successfully decoding the PDSCH transmission.

In a thirteenth aspect, alone or in combination with one or more of the above aspects, the UE: attempts to decode the PDSCH transmission; unsuccessfully decodes the PDSCH transmission; and generates a second bit of the information bit stream based on unsuccessfully decoding the PDSCH transmission.

In a fourteenth aspect, alone or in combination with one or more of the above aspects, where at least one transmission is missed from a transmitting device.

In a fifteenth aspect, alone or in combination with one or more of the above aspects, the at least one transmission is a last DCI of a HARQ feedback window.

In a sixteenth aspect, alone or in combination with one or more of the above aspects, the information bit stream is mapped to l-th sequence in the common sequence pool, and converting the information bit stream to the integer value is based on the formula $l = \text{bit2int}(b\_0 \ b\_1 \ldots b\_{(K-1)}) * 2^{(N-K)}$, where K is a number of bits of the information bit stream, where N indicates a length of bits (e.g., maximum number of bits) supported by the common sequence pool, and wherein a total number of sequences in the common sequence pool is $2^N$. N may additionally or alternatively include or correspond to a sequence length of the common sequence pool.

In a seventeenth aspect, alone or in combination with one or more of the above aspects, the information bit stream is mapped to l-th sequence in the common sequence pool, and converting the information bit stream to the integer value is based on the formula $l = \text{bit2int}(b\_0 \ b\_1 \ldots b\_{(K-1)}) * (L/2^K)$, where K is a number of bits of the information bit stream, and where L is the total number of sequences in the common sequence pool.

In an eighteenth aspect, alone or in combination with one or more of the above aspects, the selected sequence (e.g., mapped sequence) from the common sequence pool is transmitted in a PUCCH resource with M frequency tones ($M_{tones}$) and N OFDM symbols ($N_{symbols}$).

In a nineteenth aspect, alone or in combination with one or more of the above aspects, the common sequence pool includes M frequency tones ($M_{tones}$) and N OFDM symbols ($N_{symbols}$).

In a twentieth aspect, alone or in combination with one or more of the above aspects, the transmission is a PUCCH transmission.

In a twenty-first aspect, alone or in combination with one or more of the above aspects, the wireless communication device is a UE.

In a twenty-second aspect, alone or in combination with one or more of the above aspects, the wireless communication device is a base station.

In a twenty-third aspect, alone or in combination with one or more of the above aspects, the information bit stream has a first length, and the UE 115 further: converts a second information bit stream to a second integer value, the second information bit stream having a second length different from the first length; selects a second sequence from the common sequence pool based on the second integer value; and transmits a second non-coherent transmission including the second sequence.

In a twenty-fourth aspect, alone or in combination with one or more of the above aspects, the first sequence and the second sequence are the same sequence of the common sequence pool.

In a twenty-fifth aspect, alone or in combination with one or more of the above aspects, the sequence comprises a string of zeros and ones, and wherein the ones indicate positive acknowledgment bits (ACKs) and the zeros indicate negative acknowledgement bits (NACKs).

In a twenty-sixth aspect, alone or in combination with one or more of the above aspects, one or more of the NACKs comprise a dummy NACK which indicates a missed transmission by the wireless communication device.

In a twenty-seventh aspect, alone or in combination with one or more of the above aspects, the non-coherent transmission comprises the sequence, and the non-coherent transmission comprises a physical uplink control channel (PUCCH) transmission Accordingly, wireless communication devices may use common sequence pools with nested arrangements to generate non-coherent transmissions according to one or more aspects operations. By performing non-coherent transmission operations, throughput and reliability may be increased and such operations may enable enhancements when operating in particular operating conditions.

Figure 11:
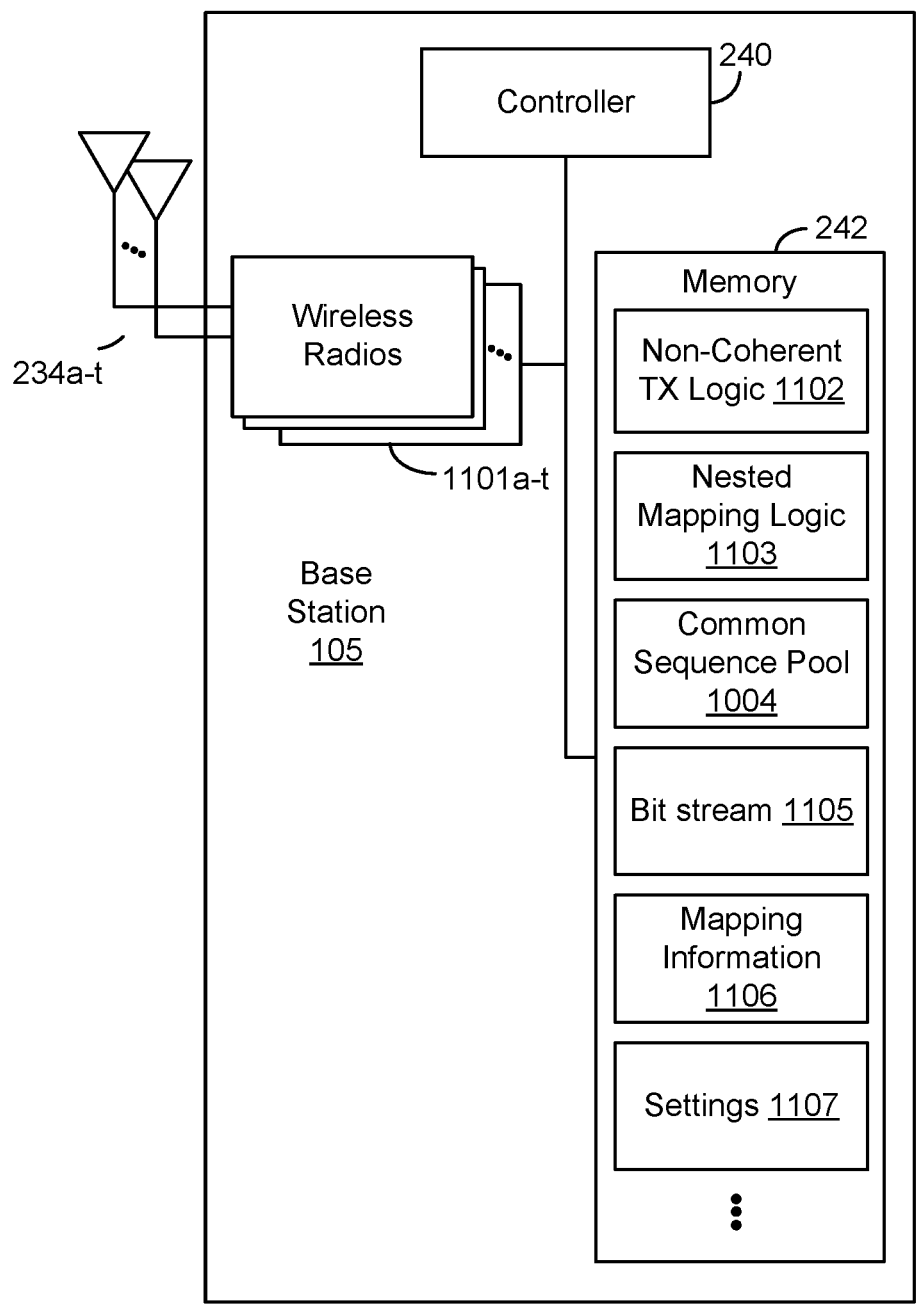
FIG. 11 is a block diagram of an example base station that supports use of a common sequence pool for non-coherent transmissions according to one or more aspects.

FIG. 9 is a flow diagram illustrating example blocks executed wireless communication device (e.g., a UE or base station) configured according to an aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1101a-t and antennas 234a-t. Wireless radios 1101a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 11, memory 282 stores Non-coherent transmission logic 1102, nested mapping logic 1103, common sequence pool data 1104, bit stream data 1105, mapping information data 1106, and settings data 1107.

At block 900, a wireless communication device, such as a base station 105, transmits common sequence pool configuration information. For example, the base station 105 transmits a configuration transmission which indicates one or more parameters of a common sequence pool or how to map bit stream strings to sequences of the common sequence pool, as described with reference to FIGS. 4-7. The common sequence pool configuration information may enable a receiving device to generate a common sequence pool for encoding and/or may enable the receiving device to translate between bit stream strings and integer values and the corresponding sequences.

The common sequence pool configuration information may include or correspond to a length of bits supported by a common sequence pool, such as N, or include or correspond to a total number of sequences in the common sequence pool, such as L which may be referred to as a cardinality of the common sequence pool.

At block 901, the base station 105 receives a non-coherent transmission, the non-coherent transmission encoded based on the common sequence pool configuration information. For example, the base station 105 receives a non-coherent transmission, such as no-coherent transmission 456 or 550, using wireless radios 1101a-t and antennas 234a-t, as described with reference to FIGS. 4-7. The non-coherent transmission may be configured to indicate feedback information, such as HARQ feedback information, and may include or correspond to a PUCCH transmission.

At block 902, the base station 105 decodes the non-coherent transmission based on the common sequence pool configuration information. For example, the base station 105 uses a common sequence pool generated or configured based on the information sent, as described with reference to FIGS. 4-7. To illustrate, the base station may generate or use a particular common sequence pool having a length and/or cardinality specified in a previous transmission to the transmitting device (e.g., a UE).

The wireless communication device (e.g., such as UE or base station) may execute additional blocks (or the wireless communication device may be configured further perform additional operations) in other implementations. For example, the base station 105 may perform one or more operations described above. As another example, the base station 105 may perform one or more aspects as presented below, such as any the first through twenty-seventh aspects described with reference to FIG. 8.

In a first aspect, the common sequence pool configuration information is configured to enable a receiving device to generate a common sequence pool for encoding non-coherent transmissions, wherein the common sequence pool has a nested structure of sequences which map different length information bit streams with the same most significant bit or bits to the same sequences.

In a second aspect, the base station generates a common sequence pool based on the common sequence pool configuration information, and the non-coherent transmission is decoded using the common sequence pool.

In a third aspect, wherein decoding the non-coherent transmission using the common sequence pool includes: parsing, by the wireless communication device, the non-coherent transmission to determine a sequence of tones; determining, by the wireless communication device, an integer value from the common sequence pool based on the sequence of tones; and determining, a bit stream based on the integer value.

In a fourth aspect, alone in combination with one or more of the above aspects, the base station determines HARQ feedback based on the bit stream.

In a fifth aspect, alone in combination with one or more of the above aspects, the common sequence pool configuration information is included in or indicated by a RRC message, a MAC CE, a DCI, a UCI, or a SCI.

Accordingly, wireless communication devices may use common sequence pools with nested arrangements to generate non-coherent transmissions according to one or more aspects operations. By performing non-coherent transmission operations, throughput and reliability may be increased and such operations may enable enhancements when operating in particular operating conditions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   converting, by a wireless communication device, an information bit stream to an integer value;
   selecting, by the wireless communication device, a sequence from a common sequence pool based on the integer value, the common sequence pool having a nested structure of sequences which map different length information bit streams with the same most significant bit or bits to the same sequences; and
   transmitting, by the wireless communication device, a non-coherent transmission indicating the sequence.

2. The method of claim 1, wherein the sequence comprises a string of zeros and ones, and wherein the ones indicate positive acknowledgment bits (ACKs) and the zeros indicate negative acknowledgement bits (NACKs).

3. The method of claim 2, wherein one or more of the NACKs comprise a dummy NACK which indicates a missed transmission by the wireless communication device.

4. The method of claim 2, further comprising:
   generating, by the wireless communication device, the information bit stream based on successfully received messages and to indicate feedback information; and
   padding, by the wireless communication device, the information bit stream with one or more zeros, wherein the one or more zeros represent the least significant bits.

5. The method of claim 1, further comprising:
   generating, by the wireless communication device, the information bit stream based on successfully received messages and to indicate feedback information.

6. The method of claim 1, further comprising:
   mapping, by the wireless communication device, the sequence to one or more resource elements, wherein transmitting the non-coherent transmission includes generating, by the wireless communication device, a waveform indicating the sequence.

7. The method of claim 6, wherein the one or more resource elements comprise a number of resource elements corresponding to the length of the sequence.

8. The method of claim 1, wherein the non-coherent transmission includes or corresponds to a hybrid automatic repeat request (HARQ) feedback transmission, and wherein the sequence indicates feedback bits.

9. The method of claim 1, wherein the non-coherent transmission does not include a reference signal.

10. The method of claim 1, further comprising:
    receiving, by the wireless communication device, a (DCI) transmission indicating a physical downlink shared channel (PDSCH) transmission; and
    receiving, by the wireless communication device, the PDSCH transmission.

11. The method of claim 10, further comprising:
    attempting to decode, by the wireless communication device, the PDSCH transmission;

successfully decoding, by the wireless communication device, the PDSCH transmission; and generating, by the wireless communication device, a bit of the information bit stream based on successfully decoding the PDSCH transmission.

12. The method of claim 10, further comprising:

attempting to decode, by the wireless communication device, the PDSCH transmission;

unsuccessfully decoding, by the wireless communication device, the PDSCH transmission; and generating, by the wireless communication device, a second bit of the information bit stream based on unsuccessfully decoding the PDSCH transmission.

13. An apparatus configured for wireless communication, the apparatus comprising:

a memory storing processor-readable code; and at least one processor communicatively coupled to the memory, the at least one processor configured to:

convert an information bit stream to an integer value;

select a sequence from a common sequence pool based on the integer value, the common sequence pool having a nested structure of sequences which map different length information bit streams with the same most significant bit or bits to the same sequences; and transmit a non-coherent transmission indicating the sequence.

14. The apparatus of claim 13, wherein the non-coherent transmission includes or corresponds to a hybrid automatic repeat request (HARQ) feedback transmission which indicates HARQ feedback information for multiple transmissions of a HARQ feedback window for the apparatus, and wherein at least one transmission intended for the apparatus and transmitted during the HARQ feedback window is not received or decoded by the apparatus.

15. The apparatus of claim 14, wherein the at least one transmission is a last downlink control information (DCI) transmission of the HARQ feedback window, and wherein the HARQ feedback transmission indicates feedback information for the last DCI transmission.

16. The apparatus of claim 13, wherein the information bit stream is mapped to l-th sequence in the common sequence pool, wherein converting the information bit stream to the integer value is based on the formula $l=bit2int(b\_0\ b\_1\ \ldots\ b\_(K-1))*2^{(N-K)}$, where K is a number of bits of the information bit stream, where N indicates a length of bits supported by the common sequence pool, and wherein a total number of sequences in the common sequence pool is $2^N$.

17. The apparatus of claim 13, wherein the bits mapped are to a l-th sequence in the common sequence pool, wherein converting the information bit stream to the integer value is based on the formula $l=bit2int(b\_0\ b\_1\ \ldots\ b\_(K-1))*(L/2^K)$, where K is a number of bits of the information bit stream, and where L is the total number of sequences in the common sequence pool.

18. The apparatus of claim 13, wherein the selected sequence from the common sequence pool is transmitted in a physical uplink control channel (PUCCH) resource with M frequency tones ($M_{tones}$) and N orthogonal frequency-division multiplexing (OFDM) symbols ($N_{symbols}$).

19. The apparatus of claim 13, wherein the common sequence pool includes M frequency tones ($M_{tones}$) and N orthogonal frequency-division multiplexing (OFDM) symbols ($N_{symbols}$).

20. The apparatus of claim 13, the non-coherent transmission comprising the sequence, and the non-coherent transmission comprising a physical uplink control channel (PUCCH) transmission.

21. The apparatus of claim 13, wherein the information bit stream has a first length, and wherein the at least one processor is further configured to:

convert a second information bit stream to a second integer value, the second information bit stream having a second length different from the first length;

select a second sequence from the common sequence pool based on the second integer value; and transmit a second non-coherent transmission including the second sequence.

22. The apparatus of claim 21, wherein the selected sequence and the second sequence indicate a same sequence of the common sequence pool.

23. The apparatus of claim 13, wherein the at least one processor is further configured to:

transmit common sequence pool configuration information;

receive a second non-coherent transmission, the second non-coherent transmission encoded based on the common sequence pool configuration information; and decode the second non-coherent transmission based on the common sequence pool configuration information.

24. A method of wireless communication comprising:

transmitting, by a wireless communication device, common sequence pool configuration information;

receiving, by the wireless communication device, a non-coherent transmission, the non-coherent transmission encoded based on the common sequence pool configuration information; and decoding, by the wireless communication device, the non-coherent transmission based on a common sequence pool associated with the common sequence pool configuration information, wherein the common sequence pool has a nested structure of sequences which map different length information bit streams with the same most significant bit or bits to the same sequences.

25. The method of claim 24, wherein the common sequence pool configuration information is configured to enable a receiving device to generate a common sequence pool for encoding non-coherent transmissions, wherein the common sequence pool has a nested structure of sequences which map different length information bit streams with the same most significant bit or bits to the same sequences.

26. The method of claim 24, further comprising:

generating a common sequence pool based on the common sequence pool configuration information, wherein the non-coherent transmission is decoded using the common sequence pool.

27. The method of claim 26, wherein decoding the non-coherent transmission using the common sequence pool includes:

parsing, by the wireless communication device, the non-coherent transmission to determine a sequence of tones;

determining, by the wireless communication device, an integer value from the common sequence pool based on the sequence of tones; and determining, by the wireless communication device, a bit stream based on the integer value.

28. An apparatus configured for wireless communication, the apparatus comprising:
- a memory storing processor-readable code; and
- at least one processor communicatively coupled to the memory, the at least one processor configured to:
  - transmit common sequence pool configuration information;
  - receive a non-coherent transmission, the non-coherent transmission encoded based on the common sequence pool configuration information; and
  - decode the non-coherent transmission based on a common sequence pool associated with the common sequence pool configuration information, wherein the common sequence pool has a nested structure of sequences which map different length information bit streams with the same most significant bit or bits to the same sequences.

29. The apparatus of claim 28, wherein to decode the non-coherent transmission generates an information bit stream, and wherein the at least one processor is further configured to:
- determine hybrid automatic repeat request (HARQ) feedback based on the information bit stream.

30. The apparatus of claim 28, wherein the common sequence pool configuration information includes or corresponds to a length of bits supported by a common sequence pool or a total number of sequences in the common sequence pool, and wherein the common sequence pool configuration information is included in or indicated by a radio resource control (RRC) message, a media access control control element (MAC CE) transmission, a downlink control information (DCI) transmission, an uplink control information (UCI) transmission, or a sidelink control information (SCI) transmission.

* * * * *